United States Patent
Delong

(10) Patent No.: US 11,215,067 B2
(45) Date of Patent: Jan. 4, 2022

(54) DUAL REDUNDANT TWO-STAGE VALVE

(71) Applicant: Hamilton Sundstrand Corporation, Charlotte, NC (US)

(72) Inventor: Zachary J. Delong, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 492 days.

(21) Appl. No.: 16/285,848

(22) Filed: Feb. 26, 2019

(65) Prior Publication Data
US 2020/0271138 A1 Aug. 27, 2020

(51) Int. Cl.
F01D 17/10 (2006.01)
F02C 7/232 (2006.01)
F02K 9/58 (2006.01)
F01D 17/14 (2006.01)
F01D 17/18 (2006.01)
F03B 1/04 (2006.01)
F02C 9/26 (2006.01)

(52) U.S. Cl.
CPC ......... F01D 17/145 (2013.01); F01D 17/10 (2013.01); F01D 17/18 (2013.01); F02C 7/232 (2013.01); F02K 9/58 (2013.01); F03B 1/04 (2013.01); F02C 9/263 (2013.01); F05D 2260/84 (2013.01)

(58) Field of Classification Search
CPC combination set(s) only.
See application file for complete search history.

(56) References Cited

U.S. PATENT DOCUMENTS

| 3,736,958 A | 6/1973 | Rostad |
| 6,871,574 B2 | 3/2005 | Barber |
| 2005/0166573 A1 | 8/2005 | Hommema |
| 2007/0031303 A1 | 2/2007 | Kaiser et al. |
| 2007/0234732 A1* | 10/2007 | Shelby ............... F02C 7/232 60/772 |
| 2014/0033689 A1 | 2/2014 | Opdenbosch |

FOREIGN PATENT DOCUMENTS

DE 3340925 A1 10/1984

OTHER PUBLICATIONS

Extended European Search Report; Application No. 19216319.4; dated Jul. 22, 2020; 8 pages.

* cited by examiner

Primary Examiner — Richard A Edgar
(74) Attorney, Agent, or Firm — Cantor Colburn LLP

(57) ABSTRACT

A vehicle power generation system including: a first solenoid spool valve; a second solenoid spool valve; a first poppet valve fluidly connected to a high pressure inlet; a second poppet valve fluidly connected to the first solenoid spool valve and the first poppet valve; a third poppet valve fluidly connected to the second solenoid spool valve, the first poppet valve, and an impulse turbine; and a fourth poppet valve fluidly connected to the second solenoid spool valve, the second poppet valve, and the impulse turbine.

20 Claims, 4 Drawing Sheets

DUAL REDUNDANT TWO-STAGE VALVE

BACKGROUND

The subject matter disclosed herein generally relates to propellant valves, and more specifically to dual redundancy in propellant valves.

Launch vehicle power generation uses impulse turbines coupled to either a hydraulic pump or electric generator. Impulse turbines require flowing pressurized propellant through a valve and nozzle directed at a turbine in order to generate shaft power. The propellant valve is controlled open and closed in order to meter propellant to maintain operating turbine speed.

BRIEF SUMMARY

According to an embodiment, a vehicle power generation system is provided. The vehicle power generation system including: a first solenoid spool valve; a second solenoid spool valve; a first poppet valve fluidly connected to a high pressure inlet; a second poppet valve fluidly connected to the first solenoid spool valve and the first poppet valve; a third poppet valve fluidly connected to the second solenoid spool valve, the first poppet valve, and an impulse turbine; and a fourth poppet valve fluidly connected to the second solenoid spool valve, the second poppet valve, and the impulse turbine.

In addition to one or more of the features described above, or as an alternative, further embodiments may include that the first solenoid spool valve further comprises: a spool housing; a spool located at least partially within the spool housing, the spool fluidly separating the spool housing into a first spool housing chamber, a second spool housing chamber, a third spool housing chamber, and a fourth spool housing chamber; and a solenoid operably connected to the spool, the solenoid being configured to translate the spool linearly within the spool housing.

In addition to one or more of the features described above, or as an alternative, further embodiments may include that the fourth spool housing chamber is located proximate the solenoid and the first spool housing chamber is located opposite the fourth spool housing chamber, wherein the second spool housing chamber and the third spool housing chamber are linearly interposed between the first spool housing chamber and the fourth spool housing chamber, and wherein the second spool housing chamber is linearly interposed between the first spool housing chamber and the third spool housing chamber.

In addition to one or more of the features described above, or as an alternative, further embodiments may include a biasing mechanism located within the first spool housing chamber.

In addition to one or more of the features described above, or as an alternative, further embodiments may include that the second solenoid spool valve further comprises: a spool housing; a spool located at least partially within the spool housing, the spool fluidly separating the spool housing into a first spool housing chamber, a second spool housing chamber, a third spool housing chamber, a fourth spool housing chamber, and a fifth spool housing chamber; and a solenoid operably connected to the spool, the solenoid being configured to translate the spool linearly within the spool housing.

In addition to one or more of the features described above, or as an alternative, further embodiments may include that the fifth spool housing chamber is located proximate the solenoid and the first spool housing chamber is located opposite the fifth spool housing chamber, wherein the second spool housing chamber, the third spool housing chamber, and fourth spool housing camber are linearly interposed between the first spool housing chamber and the fifth spool housing chamber, wherein the second spool housing chamber is linearly interposed between the first spool housing chamber and the third spool housing chamber, and wherein the third spool housing chamber is linearly interposed between the second spool housing chamber and the fourth spool housing chamber.

In addition to one or more of the features described above, or as an alternative, further embodiments may include a biasing mechanism located within the first spool housing chamber.

In addition to one or more of the features described above, or as an alternative, further embodiments may include that the first poppet valve further comprises: a poppet housing having an outlet; a poppet located within the poppet housing, the poppet fluidly separating the poppet housing into a first poppet housing chamber and a second poppet housing chamber; and a biasing mechanism located in the first poppet housing chamber, the biasing mechanism being configured to applies a linear force on the poppet towards the outlet of the first poppet housing.

In addition to one or more of the features described above, or as an alternative, further embodiments may include that the first poppet valve further comprises: a poppet housing having an outlet; a poppet located within the poppet housing, the poppet fluidly separating the poppet housing into a first poppet housing chamber and a second poppet housing chamber; and a biasing mechanism located in the first poppet housing chamber, the biasing mechanism applies a linear force on the poppet towards the outlet of the first poppet housing, wherein the first poppet housing chamber is fluidly connected to the second spool housing chamber of the first solenoid spool valve, and wherein the second poppet housing chamber is fluidly connected to the high pressure inlet.

In addition to one or more of the features described above, or as an alternative, further embodiments may include a vent outlet fluidly connected to the first spool housing chamber when the solenoid of the first solenoid spool valve is deactivated and fluidly connected to the second spool housing chamber when the solenoid of the first solenoid spool valve is activated.

In addition to one or more of the features described above, or as an alternative, further embodiments may include that the second poppet housing chamber is fluidly connected to the third poppet valve.

In addition to one or more of the features described above, or as an alternative, further embodiments may include that the second poppet valve further comprises: a poppet housing having an outlet; a poppet located within the poppet housing, the poppet fluidly separating the poppet housing into a first poppet housing chamber and a second poppet housing chamber; and a biasing mechanism located in the first poppet housing chamber, the biasing mechanism applies a linear force on the poppet towards the outlet of the first poppet housing, wherein the first poppet housing chamber is fluidly connected to the third spool housing chamber of the first solenoid spool valve, and wherein the second poppet housing chamber is fluidly connected to the second spool housing chamber of the first solenoid spool valve.

In addition to one or more of the features described above, or as an alternative, further embodiments may include a vent outlet fluidly connected to the third spool housing chamber when the solenoid of the first solenoid spool valve is deactivated and fluidly connected to the fourth spool housing chamber when the solenoid of the first solenoid spool valve is activated.

In addition to one or more of the features described above, or as an alternative, further embodiments may include that the second poppet housing chamber is fluidly connected to the fourth poppet valve.

In addition to one or more of the features described above, or as an alternative, further embodiments may include that the third poppet valve further comprises: a poppet housing having an outlet; a poppet located within the poppet housing, the poppet fluidly separating the poppet housing into a first poppet housing chamber and a second poppet housing chamber; and a biasing mechanism located in the first poppet housing chamber, the biasing mechanism applies a linear force on the poppet towards the outlet of the first poppet housing, wherein the first poppet housing chamber is fluidly connected to the fourth spool housing chamber of the second solenoid spool valve, and wherein the second poppet housing chamber is fluidly connected to the third spool housing chamber of the second solenoid spool valve when the solenoid of the second solenoid spool valve is deactivated and fluidly connected to the fourth spool housing chamber of the second solenoid spool valve when the solenoid of the second solenoid spool valve is activated.

In addition to one or more of the features described above, or as an alternative, further embodiments may include that a vent outlet fluidly connected to the fourth spool housing chamber when the solenoid of the second solenoid spool valve is deactivated and fluidly connected to the fifth spool housing chamber when the solenoid of the first solenoid spool valve is activated.

In addition to one or more of the features described above, or as an alternative, further embodiments may include that the second poppet housing chamber is fluidly connected to the impulse turbine.

In addition to one or more of the features described above, or as an alternative, further embodiments may include that the fourth poppet valve further comprises: a poppet housing having an outlet; a poppet located within the poppet housing, the poppet fluidly separating the poppet housing into a first poppet housing chamber and a second poppet housing chamber; and a biasing mechanism located in the first poppet housing chamber, the biasing mechanism applies a linear force on the poppet towards the outlet of the first poppet housing, wherein the first poppet housing chamber is fluidly connected to the second spool housing chamber of the second solenoid spool valve, and wherein the second poppet housing chamber is fluidly connected to the second spool housing chamber of the second solenoid spool valve when the solenoid of the second solenoid spool valve is deactivated and fluidly connected to the third spool housing chamber of the second solenoid spool valve when the solenoid of the second solenoid spool valve is activated.

In addition to one or more of the features described above, or as an alternative, further embodiments may include a vent outlet fluidly connected to the first spool housing chamber when the solenoid of the second solenoid spool valve is deactivated and fluidly connected to the second spool housing chamber when the solenoid of the first solenoid spool valve is activated.

In addition to one or more of the features described above, or as an alternative, further embodiments may include that the second poppet housing chamber is fluidly connected to the impulse turbine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 2A:
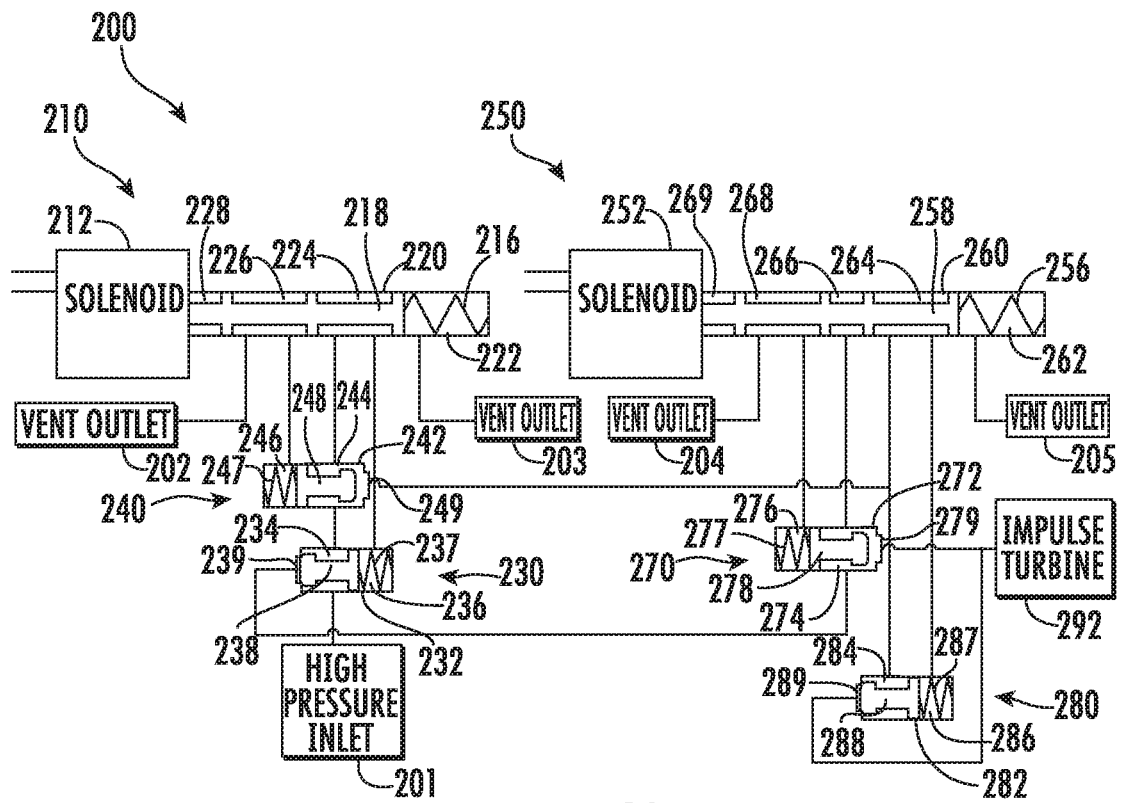
FIG. 2A is a schematic view of a vehicle power generation system when a solenoid of a first solenoid spool valve is deactivated and a solenoid of a second solenoid spool valve is deactivated, according to an embodiment of the present disclosure.
Figure 2B:
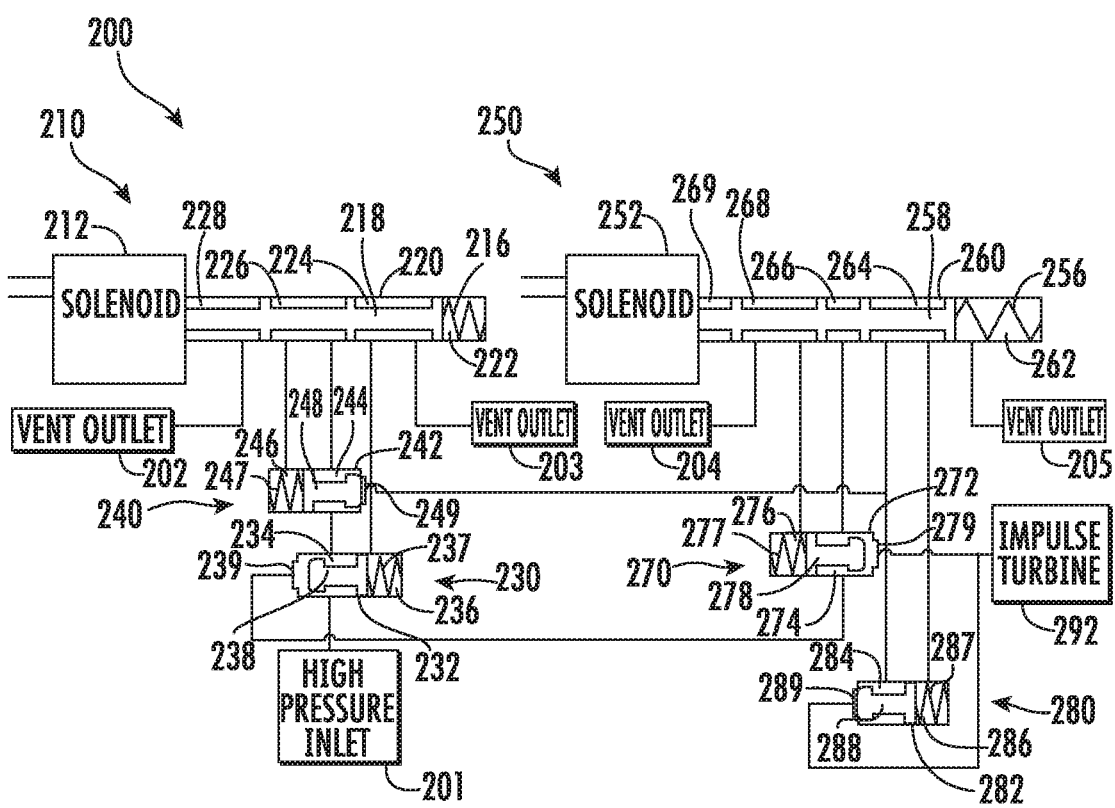
FIG. 2B is a schematic view of the vehicle power generation system of FIG. 2A when the solenoid of the first solenoid spool valve is activated and the solenoid of the second solenoid spool valve is deactivated, according to an embodiment of the present disclosure.
Figure 2C:
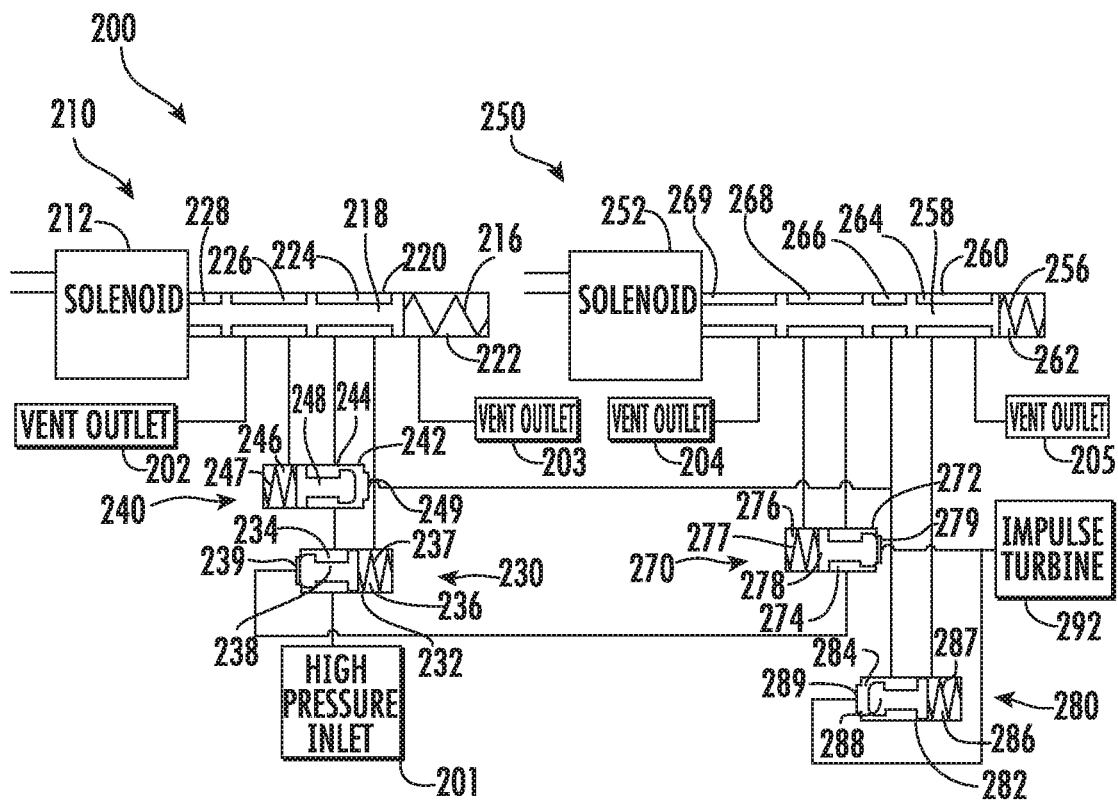
Figure 2D:
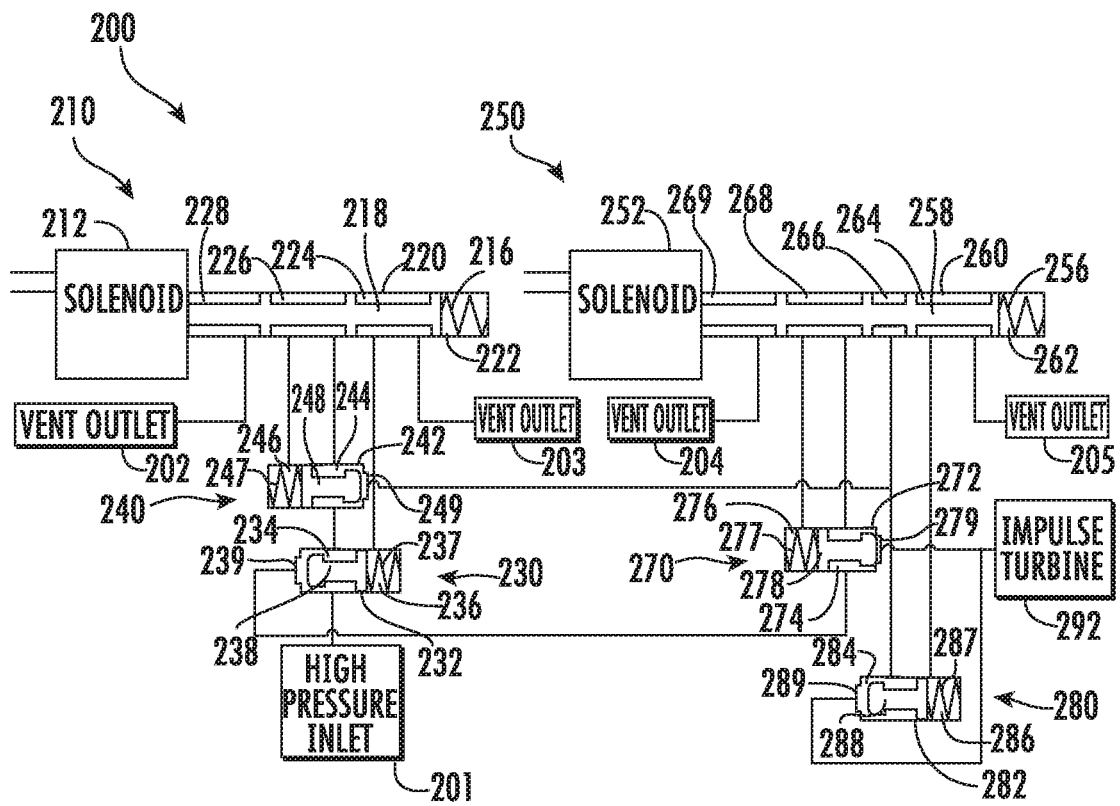

FIG. 2C is a schematic view of the vehicle power generation system of FIG. 2A when the solenoid of the first solenoid spool valve is deactivated and the solenoid of the second solenoid spool valve is activated, according to an embodiment of the present disclosure; and FIG. 2D is a schematic view of the vehicle power generation system of FIG. 2A when the solenoid of the first solenoid spool valve is activated and the solenoid of the second solenoid spool valve is activated, according to an embodiment of the present disclosure.

DETAILED DESCRIPTION

A detailed description of one or more embodiments of the disclosed apparatus and method are presented herein by way of exemplification and not limitation with reference to the Figures.

Launch vehicle power generation uses impulse turbines coupled to either a hydraulic pump or electric generator. Impulse turbines require flowing pressurized propellant through a valve and nozzle directed at a turbine in order to generate shaft power. The propellant valve is controlled open and closed in order to meter propellant to maintain operating turbine speed.

For high pressure, high flow, and high speed metering, it a two-stage valve may be utilized. Some launch vehicle power generation architectures may incorporate multiple impulse turbines in order to meet the dual redundancy requirements. Embodiments disclosed herein seek to simplify launch vehicle power generation architectures and achieve dual redundancy by the incorporation of a dual redundant two-stage valve.

Referring now to FIGS. 1A, 1B, 1C, and 1D, a block diagram view of a vehicle power generation system 100. The vehicle power generation system 100 may comprise a first solenoid spool valve 110, a second solenoid spool valve 150, a first poppet valve 130, and a second poppet valve 170. The first solenoid spool valve 110 is located upstream of the second solenoid spool valve 150 in a high pressure propellant flow path from the high pressure inlet 101 to the impulse turbine 192. The first poppet valve 130 is located upstream of the second poppet valve 170 in a high pressure propellant flow path from the high pressure inlet 101 to the impulse turbine 192. The vehicle power generation system 100 of FIGS. 1A, 1B, 1C, and 1D may be duplicated to provide dual redundancy.

The first solenoid spool valve 110 includes a solenoid 112 operably connected to a spool 118 located at least partially within a spool housing 120. The solenoid 112 being configured (i.e. operable) to translate the spool 118 linearly within the spool housing 120, as described herein. The spool 118 fluidly separates the spool housing 120 into a first spool housing chamber 122, a second spool housing chamber 124, and a third spool housing chamber 128. The third spool housing chamber 128 is located proximate the solenoid 112 and the first spool housing chamber 122 is located opposite the third spool housing chamber 128. The second spool housing chamber 124 is linearly interposed between the first spool housing chamber 122 and the third spool housing chamber 128. A biasing mechanism 116 is located within the first spool housing chamber 122. In an embodiment, the biasing mechanism 116 may be a spring. The biasing mechanism 116 applies a force against the spool housing 120 and the spool 118, such that a linear force is applied on the spool 118 towards the solenoid 112. The spool 118 may be pushed linearly towards the solenoid 112 by the biasing mechanism 116 when the solenoid 112 is deactivated (i.e., de-energized). When the solenoid 112 is activated (i.e., energized), the solenoid 112 pushes the spool 118 away from the solenoid 112 and linearly towards the biasing mechanism 116, such that the biasing mechanism 116 is compressed. Therefore, the spool 118 may extend further into the spool housing 120 when the solenoid 112 is activated and retract into solenoid 112 when the solenoid 112 is deactivated.

The second solenoid spool valve 150 includes a solenoid 152 operably connected to a spool 158 located at least partially within a spool housing 160. The solenoid 152 being configured (i.e. operable) to translate the spool 158 linearly within the spool housing 160, as described herein. The spool 158 fluidly separates the spool housing 160 into a first spool housing chamber 162, a second spool housing chamber 164, and a third spool housing chamber 168. The third spool housing chamber 168 is located proximate the solenoid 152 and the first spool housing chamber 162 is located opposite the third spool housing chamber 168. The second spool housing chamber 164 is linearly interposed between the first spool housing chamber 162 and the third spool housing chamber 168. A biasing mechanism 156 is located within the first spool housing chamber 162. In an embodiment, the biasing mechanism 156 may be a spring. The biasing mechanism 156 applies a force against the spool housing 160 and the spool 158, such that a linear force is applied on the spool 158 towards the solenoid 152. The spool 158 may be pushed linearly towards the solenoid 152 by the biasing mechanism 156 when the solenoid 152 is deactivated (i.e., de-energized). When the solenoid 152 is activated (i.e., energized), the solenoid 152 pushes the spool 158 away from the solenoid 152 and linearly towards the biasing mechanism 156, such that the biasing mechanism 156 is compressed. Therefore, the spool 158 may extend further into the spool housing 160 when the solenoid 152 is activated and retract into solenoid 152 when the solenoid 152 is deactivated.

The first poppet valve 130 includes a poppet 138 located within a poppet housing 132. The poppet 138 is operable to translate linearly within the poppet housing 132 as described herein. The poppet 138 fluidly separates the poppet housing 132 into a first poppet housing chamber 136 and a second poppet housing chamber 134 linearly opposite the first poppet housing chamber 136. A biasing mechanism 137 is located within the first poppet housing chamber 136. In an embodiment, the biasing mechanism 137 may be a spring. The biasing mechanism 137 applies a force against the poppet housing 132 and the poppet 138, such that a linear force is applied on the poppet 138 towards an outlet 139 of the poppet housing 132. The poppet 138 may be pushed linearly towards outlet 139 by the biasing mechanism 137 and seal the outlet 139 (i.e., preventing fluid movement through the outlet 139).

The second poppet valve 170 includes a poppet 178 located within a poppet housing 172. The poppet 178 is operable to translate linearly within the poppet housing 172 as described herein. The poppet 178 fluidly separates the poppet housing 172 into a first poppet housing chamber 176 and a second poppet housing chamber 174 linearly opposite the first poppet housing chamber 176. A biasing mechanism 177 is located within the first poppet housing chamber 176. In an embodiment, the biasing mechanism 177 may be a spring. The biasing mechanism 177 applies a force against the poppet housing 172 and the poppet 178, such that a linear force is applied on the poppet 178 towards an outlet 179 of the poppet housing 172. The poppet 178 may be pushed linearly towards outlet 179 by the biasing mechanism 177 and seal the outlet 179 (i.e., preventing fluid movement through the outlet 179).

High pressure propellant may flow from the high pressure inlet 101 to the impulse turbine 192 depending on whether the solenoid 112 of the first solenoid spool valve 110 is activated and/or the solenoid 152 of the second solenoid spool valve 150 is activated. FIGS. 1A, 1B, 1C, and 1D illustrate different combinations of activation of at least one of the solenoid 112 of the first solenoid spool valve 110 is activated and the solenoid 152 of the second solenoid spool valve 150 is activated.

Figure 1A:
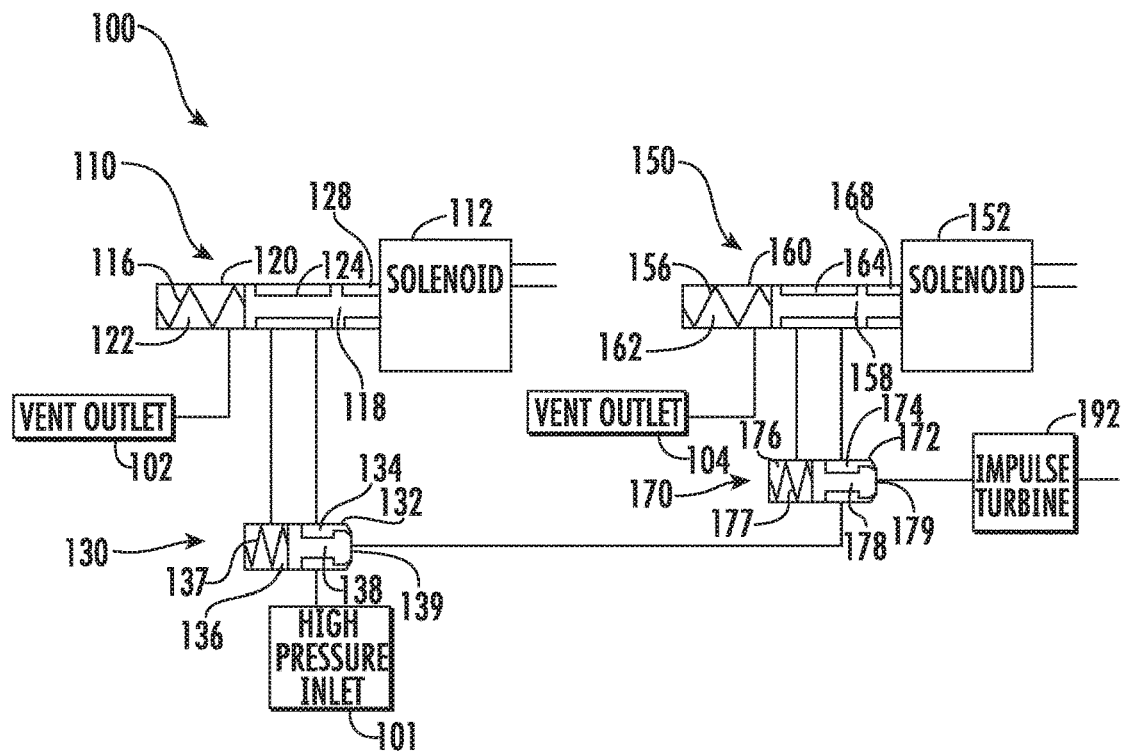
FIG. 1A is a schematic view of a vehicle power generation system when a solenoid of a first solenoid spool valve is deactivated and a solenoid of a second solenoid spool valve is deactivated.

Referring now to FIG. 1A, a solenoid activation scenario of the vehicle power generation system 100 is illustrated when the solenoid 112 of the first solenoid spool valve 110 is deactivated and the solenoid 152 of the second solenoid spool valve 150 is deactivated. In the solenoid activation scenario illustrated in FIG. 1A, the high pressure inlet 101 is fluidly connected to the second poppet housing chamber 134 of the first poppet valve 130. The high pressure inlet 101 provides high pressure propellant to the second poppet housing chamber 134 of the first poppet valve 130. The second poppet housing chamber 134 is fluidly connected to the second spool housing chamber 124 of the first solenoid spool valve 110 and the high pressure propellant is provided to the second spool housing chamber 124 of the first solenoid spool valve 110 from the second poppet housing chamber 134. The first spool housing chamber 122 of the first solenoid spool valve 110 is fluidly connected to a vent outlet 102, which provides vent air to the first spool housing chamber 122 of the first solenoid spool valve 110. The vent air is at a lower pressure than the high pressure propellant from the high pressure inlet 101.

The second spool housing chamber 124 of the first solenoid spool valve 110 is also fluidly connected to the first poppet housing chamber 136 of the first poppet valve 130 and the high pressure propellant is provided to the first poppet housing chamber 136 of the first poppet valve 130 from the second spool housing chamber 124. The high pressure propellant in the first poppet housing chamber 136 of the first poppet valve 130 balances the forces reacted on the poppet 138 by high pressure propellant in the second poppet housing chamber 134 of the first poppet valve 130 and allows the biasing mechanism 137 to force the poppet 138 to seal the outlet 139 of the first poppet valve 130, thus preventing high pressure propellant from moving from the first poppet valve 130 to the second poppet valve 170.

Figure 1B:
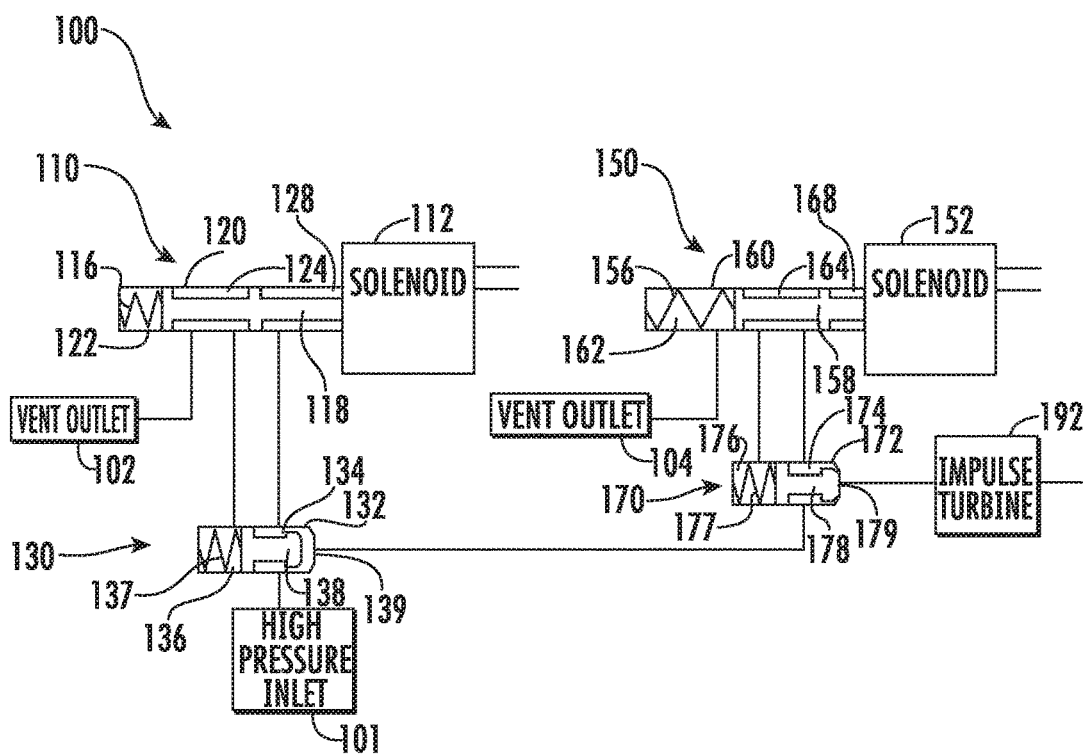
FIG. 1B is a schematic view of the vehicle power generation system of FIG. 1A when the solenoid of the first solenoid spool valve is activated and the solenoid of the second solenoid spool valve is deactivated.

Referring now to FIG. 1B, a solenoid activation scenario of the vehicle power generation system 100 is illustrated when the solenoid 112 of the first solenoid spool valve 110 is activated and the solenoid 152 of the second solenoid spool valve 150 is deactivated. In the solenoid activation scenario illustrated in FIG. 1B, the high pressure inlet 101 is fluidly connected to the second poppet housing chamber 134 of the first poppet valve 130. The high pressure inlet 101 provides high pressure propellant to the second poppet housing chamber 134 of the first poppet valve 130. Due to the activation of the solenoid 112, the second poppet housing chamber 134 is no longer fluidly connected to the second spool housing chamber 124 of the first solenoid spool valve 110. Rather the second spool housing chamber 124 is fluidly connected to a vent outlet 102. The vent outlet 102 is a source of vent air that is at a pressure lower than the high pressure propellant provided by the high pressure inlet 101. The vent outlet 102 is fluidly connected to the second spool housing chamber 124 and provides vent air to the second spool housing chamber 124. The second spool housing chamber 124 is also fluidly connected to the first poppet housing chamber 136 of the first poppet valve 130 and the vent air is provided to the first poppet housing chamber 136. The vent air in the first poppet housing chamber 136 is at a lower pressure than the high pressure propellant in the second poppet housing chamber 134. The force on the poppet 138 from the vent air in the first poppet housing chamber 136 and the biasing mechanism 137 is less than the force on the poppet 138 from the high pressure propellant in the second poppet housing chamber 134, which moves the poppet 138 away from the outlet 139 of the first poppet valve 130 and allows high pressure propellant to move from the first poppet valve 130 to the second poppet valve 170. The outlet 139 of the first poppet valve 130 fluidly connects the second poppet housing chamber 134 of the first poppet valve 130 to the second poppet housing chamber 174 of the second poppet valve 170.

The outlet 139 of the first poppet valve 130 provides high pressure propellant to the second poppet housing chamber 174 of the second poppet valve 170. The second poppet housing chamber 174 is fluidly connected to the second spool housing chamber 164 of the second solenoid spool valve 150 and the high pressure propellant is provided to the second spool housing chamber 164 of the second solenoid spool valve 150 from the second poppet housing chamber 174. The first spool housing chamber 162 of the second solenoid spool valve 150 is fluidly connected to a vent outlet 104, which provides vent air to the first spool housing chamber 162 of the second solenoid spool valve 150. The vent air is at a pressure lower than the pressure of the high pressure propellant from the high pressure inlet 101.

The second spool housing chamber 164 of the second solenoid spool valve 150 is also fluidly connected to the first poppet housing chamber 176 of the second poppet valve 170 and the high pressure propellant is provided to the first poppet housing chamber 176 of the second poppet valve 170 from the second spool housing chamber 164. The high pressure propellant in the first poppet housing chamber 176 of the second poppet valve 170 balances the forces reacted on the poppet 178 by the high pressure propellant in the second poppet housing chamber 174 of the second poppet valve 170 and allows the biasing mechanism 177 to force the poppet 178 to seal the outlet 179 of the second poppet valve 170, thus preventing high pressure propellant from moving from the second poppet valve 170 to the impulse turbine 192.

Figure 1C:
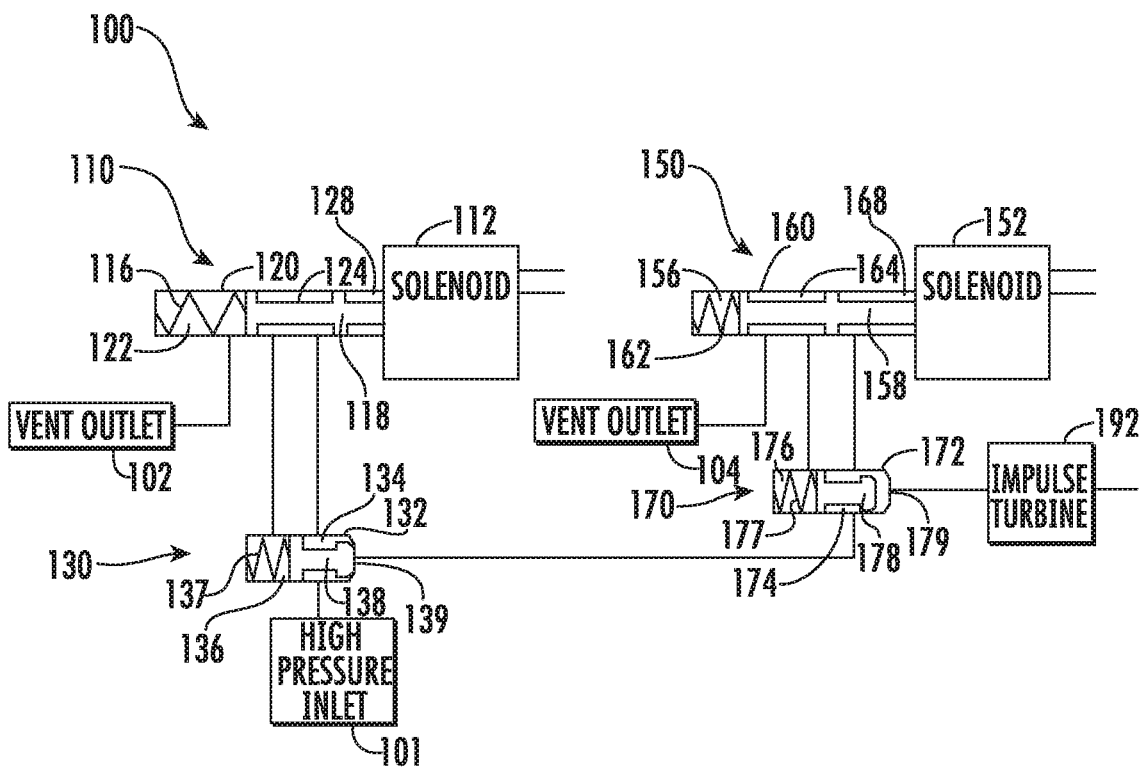
FIG. 1C is a schematic view of the vehicle power generation system of FIG. 1A when the solenoid of the first solenoid spool valve is deactivated and the solenoid of the second solenoid spool valve is activated.

Referring now to FIG. 1C, a solenoid activation scenario of the vehicle power generation system 100 is illustrated when the solenoid 112 of the first solenoid spool valve 110 is deactivated and the solenoid 152 of the second solenoid spool valve 150 is activated. In the solenoid activation scenario illustrated in FIG. 1C, the high pressure inlet 101 is fluidly connected to the second poppet housing chamber 134 of the first poppet valve 130. The high pressure inlet 101 provides high pressure propellant to the second poppet housing chamber 134 of the first poppet valve 130. The second poppet housing chamber 134 is fluidly connected to the second spool housing chamber 124 of the first solenoid spool valve 110 and the high pressure propellant is provided to the second spool housing chamber 124 of the first solenoid spool valve 110 from the second poppet housing chamber 134. The first spool housing chamber 122 of the first solenoid spool valve 110 is fluidly connected to a vent outlet 102, which provides vent air to the first spool housing chamber 122 of the first solenoid spool valve 110. The vent air is at a lower pressure than the high pressure propellant from the high pressure inlet 101.

The second spool housing chamber 124 of the first solenoid spool valve 110 is also fluidly connected to the first poppet housing chamber 136 of the first poppet valve 130 and the high pressure propellant is provided to the first poppet housing chamber 136 of the first poppet valve 130 from the second spool housing chamber 124. The high pressure propellant in the first poppet housing chamber 136 of the first poppet valve 130 balances the forces reacted on the poppet 138 by the high pressure propellant in the second poppet housing chamber 134 of the first poppet valve 130 and allows the biasing mechanism 137 to force the poppet 138 to seal the outlet 139 of the first poppet valve 130, thus preventing high pressure propellant from moving from the first poppet valve 130 to the second poppet valve 170.

Summarily, the results of the solenoid activation scenario of the vehicle power generation system 100 illustrated in FIG. 1C is similar to results of the solenoid activation scenario of the vehicle power generation system 100 illustrated in FIG. 1A. Therefore, if only one of the solenoids 112, 152 is activated high pressure propellant from the high pressure inlet 101 will not reach the impulse turbine 192.

Figure 1D:
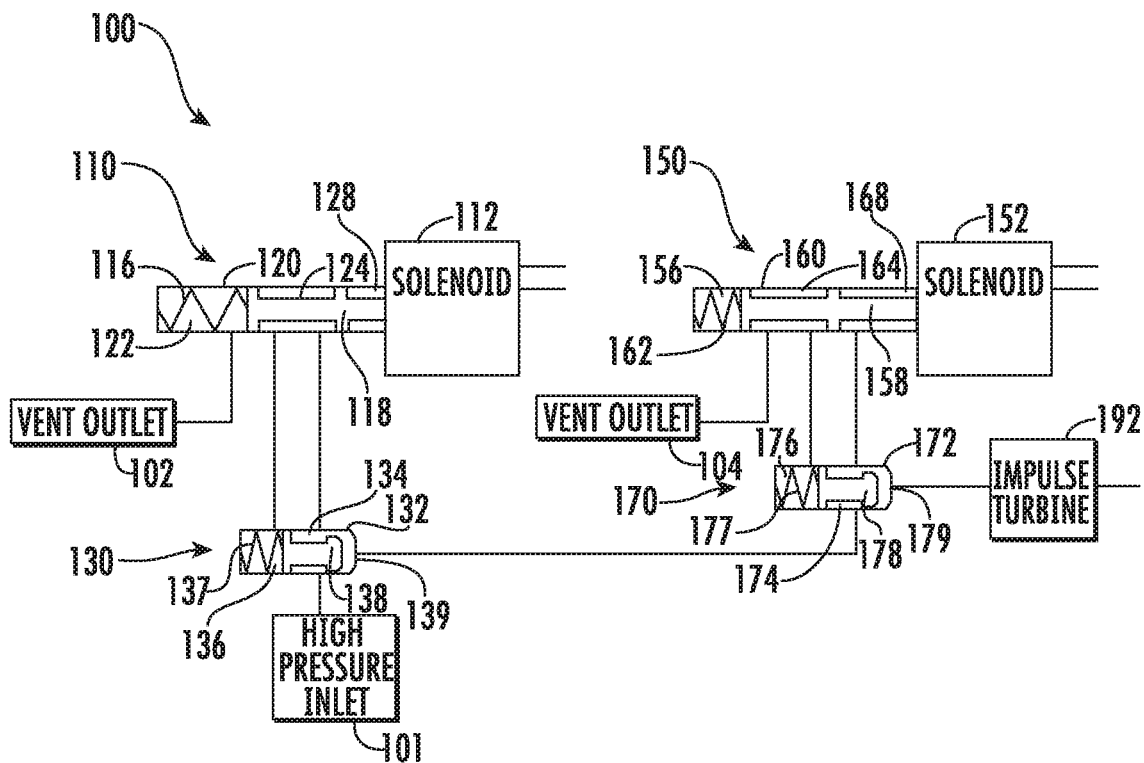
FIG. 1D is a schematic view of the vehicle power generation system of FIG. 1A when the solenoid of the first solenoid spool valve is activated and the solenoid of the second solenoid spool valve is activated.

Referring now to FIG. 1D, a solenoid activation scenario of the vehicle power generation system 100 is illustrated when the solenoid 112 of the first solenoid spool valve 110 is activated and the solenoid 152 of the second solenoid spool valve 150 is activated. In the solenoid activation scenario illustrated in FIG. 1D, the high pressure inlet 101 is fluidly connected to the second poppet housing chamber 134 of the first poppet valve 130. The high pressure inlet 101 provides high pressure propellant to the second poppet housing chamber 134 of the first poppet valve 130. Due to the activation of the solenoid 112, the second poppet housing chamber 134 is no longer fluidly connected to the second spool housing chamber 124 of the first solenoid spool valve 110. Rather the second spool housing chamber 124 is fluidly connected to a vent outlet 102. The vent outlet 102 is a source of vent air that is at a pressure lower than the high pressure propellant provided by the high pressure inlet 101. The vent outlet 102 is fluidly connected to the second spool housing chamber 124 and provides vent air to the second spool housing chamber 124. The second spool housing chamber 124 is also fluidly connected to the first poppet housing chamber 136 of the first poppet valve 130 and the vent air is provided to the first poppet housing chamber 136. The vent air in the first poppet housing chamber 136 is at a lower pressure than the high pressure propellant in the second poppet housing chamber 134. The force on the poppet 138 from the vent air in the first poppet housing chamber 136 and the biasing mechanism 137 is less than the force on the poppet 138 from the high pressure propellant in the second poppet housing chamber 134, which moves the poppet 138 away from the outlet 139 of the first poppet valve 130 and allows high pressure propellant to move from the first poppet valve 130 to the second poppet valve 170. The outlet 139 of the first poppet valve 130 fluidly connects the second poppet housing chamber 134 of the first poppet valve 130 to the second poppet housing chamber 174 of the second poppet valve 170.

The outlet 139 of the first poppet valve 130 provides high pressure propellant to the second poppet housing chamber 174 of the second poppet valve 170. Due to the activation of the solenoid 152, the second poppet housing chamber 174 is no longer fluidly connected to the second spool housing chamber 164 of the second solenoid spool valve 150. Rather the second spool housing chamber 164 is fluidly connected to a vent outlet 104. The vent outlet 104 is a source of vent air that is at a pressure lower than the high pressure propellant provided by the high pressure inlet 101. The vent outlet 104 is fluidly connected to the second spool housing chamber 164 and provides vent air to the second spool housing chamber 164. The second spool housing chamber 164 is also fluidly connected to the first poppet housing chamber 176 of the second poppet valve 150 and the vent air is provided to the first poppet housing chamber 176. The vent air in the first poppet housing chamber 176 is at a lower pressure than the high pressure propellant in the second poppet housing chamber 174. The force on the poppet 178 from the vent air in the first poppet housing chamber 176 and the biasing mechanism 177 is less than the force on the poppet 178 from the high pressure propellant in the second poppet housing chamber 174, which moves the poppet 178 away from the outlet 179 of the second poppet valve 170 and allows high pressure propellant to move from the second poppet valve 170 to the impulse turbine 192. The outlet 179 of the second poppet valve 170 fluidly connects the second poppet housing chamber 174 of the second poppet valve 170 to the impulse turbine 192.

Therefore, as illustrated by FIGS. 1A, 1B, 1C, and 1D, high pressure propellant from the high pressure inlet 101 may only reach the impulse turbine 192 if both the solenoid 112 of the first solenoid spool valve 110 is activated and the solenoid 152 of the second solenoid spool valve 110 is activated.

Referring now to FIGS. 2A, 2B, 2C, and 2D, a block diagram view of a vehicle power generation system 200 incorporating four poppet valves 230, 240, 270, 280 for dual redundancy, according to an embodiment of the present disclosure. The vehicle power generation system 200 may comprise a first solenoid spool valve 210, a second solenoid spool valve 250, a first poppet valve 230, a second poppet valve 240, a third poppet valve 270, and a fourth poppet valve 280. The first solenoid spool valve 210 is located upstream of the second solenoid spool valve 250 in a high pressure propellant flow path from the high pressure inlet 201 to the impulse turbine 292. The first poppet valve 230 is located upstream of the second poppet valve 240 in a high pressure propellant flow path from the high pressure inlet 201 to the impulse turbine 292. The second poppet valve 240 is located upstream of the fourth poppet valve 280 in the high pressure propellant flow path from the high pressure inlet 201 to the impulse turbine 292. The first poppet valve 230 is located upstream of the third poppet valve 270 in the high pressure propellant flow path from the high pressure inlet 201 to the impulse turbine 292.

The first solenoid spool valve 210 includes a solenoid 212 operably connected to a spool 218 located at least partially within a spool housing 220. The solenoid 212 being configured (i.e. operable) to translate the spool 218 linearly within the spool housing 220, as described herein. The spool 218 fluidly separates the spool housing 220 into a first spool housing chamber 222, a second spool housing chamber 224, a third spool housing chamber 226, and a fourth spool housing chamber 228. The fourth spool housing chamber 228 is located proximate the solenoid 212 and the first spool housing chamber 222 is located opposite the fourth spool housing chamber 228. The second spool housing chamber 224 and the third spool housing chamber 226 are linearly interposed between the first spool housing chamber 222 and the fourth spool housing chamber 228. The second spool housing chamber 224 is linearly interposed between the first spool housing chamber 222 and the third spool housing chamber 226. A biasing mechanism 216 is located within the first spool housing chamber 222. In an embodiment, the biasing mechanism 216 may be a spring. The biasing mechanism 216 applies a force against the spool housing 220 and the spool 218, such that a linear force is applied on the spool 218 towards the solenoid 212. The spool 218 may be pushed linearly towards the solenoid 212 by the biasing mechanism 216 when the solenoid 212 is deactivated (i.e., de-energized). When the solenoid 212 is activated (i.e., energized), the solenoid 212 pushes the spool 218 away from the solenoid 212 and linearly towards the biasing mechanism 216, such that the biasing mechanism 216 is compressed. Therefore, the spool 218 may extend further into the spool housing 220 when the solenoid 212 is activated and retract into solenoid 212 when the solenoid 212 is deactivated.

The second solenoid spool valve 250 includes a solenoid 252 operably connected to a second spool 258 located at least partially within a spool housing 260. The solenoid 252 being configured (i.e. operable) to translate the second spool 258 linearly within the spool housing 260, as described herein. The second spool 258 fluidly separates the spool housing 260 into a first spool housing chamber 262, a second spool housing chamber 264, a third spool housing chamber 266, a fourth spool housing chamber 268, and a fifth housing chamber 269. The fifth spool housing chamber 269 is located proximate the solenoid 252 and the first spool housing chamber 262 is located opposite the fifth spool housing chamber 269. The second spool housing chamber 264, the third spool housing chamber 266, and fourth spool housing camber 268 are linearly interposed between the first spool housing chamber 262 and the fifth spool housing chamber 269. The second spool housing chamber 264 is linearly interposed between the first spool housing chamber 262 and the third spool housing chamber 266. The third spool housing chamber 266 is linearly interposed between the second spool housing chamber 264 and the fourth spool housing chamber 268. A biasing mechanism 256 is located within the first spool housing chamber 262. In an embodiment, the biasing mechanism 256 may be a spring. The biasing mechanism 256 applies a force against the spool housing 260 and the second spool 258, such that a linear force is applied on the second spool 258 towards the solenoid 252. The second spool 258 may be pushed linearly towards the solenoid 252 by the biasing mechanism 256 when the solenoid 252 is deactivated (i.e., de-energized). When the solenoid 252 is activated (i.e., energized), the solenoid 252 pushes the second spool 258 away from the solenoid 252 and linearly towards the biasing mechanism 256, such that the biasing mechanism 256 is compressed. Therefore, the second spool 258 may extend further into the spool housing 260 when the solenoid 252 is activated and retract into solenoid 252 when the solenoid 252 is deactivated.

The first poppet valve 230 includes a poppet 238 located within a poppet housing 232. The poppet 238 is operable to translate linearly within the poppet housing 232 as described herein. The poppet 238 fluidly separates the poppet housing 232 into a first poppet housing chamber 236 and a second poppet housing chamber 234 linearly opposite the first poppet housing chamber 236. A biasing mechanism 237 is located within first poppet housing chamber 236. In an embodiment, the biasing mechanism 237 may be a spring. The biasing mechanism 237 applies a force against the poppet housing 232 and the poppet 238, such that a linear force is applied on the poppet 238 towards an outlet 239 of the poppet housing 232. The poppet 238 may be pushed linearly towards outlet 239 by the biasing mechanism 237 and seal the outlet 239 (i.e., preventing fluid movement through the outlet 239).

The second poppet valve 240 includes a poppet 248 located within a poppet housing 242. The poppet 248 is operable to translate linearly within the poppet housing 242 as described herein. The poppet 248 fluidly separates the poppet housing 242 into a first poppet housing chamber 246 and a second poppet housing chamber 244 linearly opposite the first poppet housing chamber 246. A biasing mechanism 247 is located within first poppet housing chamber 246. In an embodiment, the biasing mechanism 247 may be a spring. The biasing mechanism 247 applies a force against the poppet housing 242 and the poppet 248, such that a linear force is applied on the poppet 248 towards an outlet 249 of the poppet housing 242. The poppet 248 may be pushed linearly towards outlet 249 by the biasing mechanism 247 and seal the outlet 249 (i.e., preventing fluid movement through the outlet 249).

The third poppet valve 270 includes a poppet 278 located within a poppet housing 272. The poppet 278 is operable to translate linearly within the poppet housing 272 as described herein. The poppet 278 fluidly separates the poppet housing 272 into a first poppet housing chamber 276 and a second poppet housing chamber 274 linearly opposite the first poppet housing chamber 276. A biasing mechanism 277 is located within first poppet housing chamber 276. In an embodiment, the biasing mechanism 277 may be a spring. The biasing mechanism 277 applies a force against the poppet housing 272 and the poppet 278, such that a linear force is applied on the poppet 278 towards an outlet 279 of the poppet housing 272. The poppet 278 may be pushed linearly towards outlet 279 by the biasing mechanism 277 and seal the outlet 279 (i.e., preventing fluid movement through the outlet 279).

The fourth poppet valve 280 includes a poppet 288 located within a poppet housing 282. The poppet 288 is operable to translate linearly within the poppet housing 282 as described herein. The poppet 288 fluidly separates the poppet housing 282 into a first poppet housing chamber 286 and a second poppet housing chamber 284 linearly opposite the first poppet housing chamber 286. A biasing mechanism 287 is located within first poppet housing chamber 286. In an embodiment, the biasing mechanism 287 may be a spring. The biasing mechanism 287 applies a force against the poppet housing 282 and the poppet 288, such that a linear force is applied on the poppet 288 towards an outlet 289 of the poppet housing 282. The poppet 288 may be pushed linearly towards outlet 289 by the biasing mechanism 287 and seal the outlet 289 (i.e., preventing fluid movement through the outlet 289).

High pressure propellant may flow from the high pressure inlet 201 to the impulse turbine 292 depending on whether the solenoid 212 of the first solenoid spool valve 210 is activated and/or the solenoid 252 of the second solenoid spool valve 250 is activated. FIGS. 2A, 2B, 2C, and 2D illustrate different combinations of activation of at least one of the solenoid 212 of the first solenoid spool valve 210 is activated and the solenoid 252 of the second solenoid spool valve 250 is activated.

Referring now to FIG. 2A, a solenoid activation scenario of the vehicle power generation system 200 is illustrated when the solenoid 212 of the first solenoid spool valve 210 is deactivated and the solenoid 252 of the second solenoid spool valve 250 is deactivated. In the solenoid activation scenario illustrated in FIG. 2A, the high pressure inlet 201 is fluidly connected to the second poppet housing chamber 234 of the first poppet valve 230. The high pressure inlet 201 provides high pressure propellant to the second poppet housing chamber 234 of the first poppet valve 230. The second poppet housing chamber 234 of the first poppet valve 230 is fluidly connected to the second poppet housing chamber 244 of the second poppet valve 240 and the high pressure propellant is provided to the second poppet housing chamber 244 of the second poppet valve 240 from the second poppet housing chamber 234 of the first poppet valve 230. The second poppet housing chamber 244 of the second poppet valve 240 is fluidly connected to the second spool housing chamber 224 of the first solenoid spool valve 210 and the high pressure propellant is provided to the second spool housing chamber 224 of the first solenoid spool valve 210 from the second poppet housing chamber 244 of the second poppet valve 240. The first spool housing chamber 222 of the first solenoid spool valve 210 is fluidly connected to a vent outlet 203, which provides vent air to the first spool housing chamber 222 of the first solenoid spool valve 210. The vent air is at a lower pressure than the high pressure propellant from the high pressure inlet 201.

The second spool housing chamber 224 of the first solenoid spool valve 210 is also fluidly connected to the first poppet housing chamber 236 of the first poppet valve 230 and the high pressure propellant is provided to the first poppet housing chamber 236 of the first poppet valve 230 from second spool housing chamber 224 of the first solenoid spool valve 210. The high pressure propellant in the first poppet housing chamber 236 of the first poppet valve 230 balances the forces reacted on the poppet 238 by the high pressure propellant in the second poppet housing chamber 234 of the first poppet valve 230 and allows the biasing mechanism 237 to force the poppet 238 to seal the outlet 239 of the first poppet valve 230, thus preventing high pressure propellant from moving from the first poppet valve 230 to the third poppet valve 270.

Additionally, the third spool housing chamber 226 is fluidly connected to a vent outlet 202. The vent outlet 202 is a source of vent air that is at a pressure lower than the high pressure propellant provided by the high pressure inlet 201. The vent outlet 202 is fluidly connected to the third spool housing chamber 226 and provides vent air to the third spool housing chamber 226. The third spool housing chamber 226 is also fluidly connected to the first poppet housing chamber 246 of the second poppet valve 240 and the vent air is provided to the first poppet housing chamber 246 of the second poppet valve 240. The vent air in the first poppet housing chamber 246 is at a lower pressure than the high pressure propellant in the second poppet housing chamber 244 of the second poppet valve 240. The force on the poppet 248 from the vent air in the first poppet housing chamber 246 and the biasing mechanism 247 is less than the force on the poppet 248 from the high pressure propellant in the second poppet housing chamber 244, which moves the poppet 248 away from the outlet 249 of the second poppet valve 240 and allows high pressure propellant to move from the second poppet valve 240 to the fourth poppet valve 280. The outlet 249 of the second poppet valve 240 fluidly connects the second poppet housing chamber 244 of the second poppet valve 240 to the second poppet housing chamber 284 of the fourth poppet valve 280.

The outlet 249 of the second poppet valve 240 provides high pressure propellant the second poppet housing chamber 284 of the fourth poppet valve 280. The second poppet housing chamber 284 of the fourth poppet valve 280 is fluidly connected to the second spool housing chamber 264 of the second solenoid spool valve 250 and the high pressure propellant is provided to the second spool housing chamber 264 of the second solenoid spool valve 250 from the second poppet housing chamber 284 of the fourth poppet valve 280. The first spool housing chamber 262 of the second solenoid spool valve 250 is fluidly connected to a vent outlet 205, which provides vent air to the first spool housing chamber 262 of the second solenoid spool valve 250. The vent air is at a pressure lower than the pressure of the high pressure propellant from the high pressure inlet 201.

The second spool housing chamber 264 of the second solenoid spool valve 250 is also fluidly connected to the first poppet housing chamber 286 of the fourth poppet valve 280 and the high pressure propellant is provided to the first poppet housing chamber 286 of the fourth poppet valve 280 from the second spool housing chamber 264 of the second solenoid spool valve 250. The high pressure propellant in the first poppet housing chamber 286 of the fourth poppet valve 280 balances the forces reacted on the poppet 288 by the high pressure propellant in the second poppet housing chamber 284 of the fourth poppet valve 280 and allows the biasing mechanism 287 to force the poppet 288 to seal the outlet 289 of the second poppet valve 280, thus preventing high pressure propellant from moving from the fourth poppet valve 280 to the impulse turbine 292.

Advantageously, as illustrated by FIG. 2A, high pressure propellant from the high pressure inlet 201 may be prevented from reaching the impulse turbine 292 if the solenoid 212 of the first solenoid spool valve 210 is deactivated and the solenoid 252 of the second solenoid spool valve 250 is deactivated.

Referring now to FIG. 2B, a solenoid activation scenario of the vehicle power generation system 200 is illustrated when the solenoid 212 of the first solenoid spool valve 210 is activated and the solenoid 252 of the second solenoid spool valve 250 is deactivated. In the solenoid activation scenario illustrated in FIG. 2B, the high pressure inlet 201 is fluidly connected to the second poppet housing chamber 234 of the first poppet valve 230. The high pressure inlet 201 provides high pressure propellant to the second poppet housing chamber 234 of the first poppet valve 230. The second poppet housing chamber 234 of the first poppet valve 230 is fluidly connected to the second poppet housing chamber 244 of the second poppet valve 240 and the high pressure propellant is provided to the second poppet housing chamber 244 of the second poppet valve 240 from the second poppet housing chamber 234.

Due to the activation of the solenoid 212, the second poppet housing chamber 244 is no longer fluidly connected to the second spool housing chamber 224 of the first solenoid spool valve 210. Rather the second poppet housing chamber 244 is fluidly connected to the third spool housing chamber 226 and high pressure propellant is provided to the third spool housing chamber 226 from the second poppet housing 244 of the second poppet valve 240. The third spool housing chamber 226 of the first solenoid spool valve 210 is also fluidly connected to the first poppet housing chamber 246 of the second poppet valve 240 and the high pressure propellant is provided to the first poppet housing chamber 246 of the second poppet valve 240 from the third spool housing chamber 226. The high pressure propellant in the first poppet housing chamber 246 of the second poppet valve 240 balances the forces reacted on the poppet 248 by the high pressure propellant in the second poppet housing chamber 244 of the second poppet valve 240 and allows the biasing mechanism 247 to force the poppet 248 to seal the outlet 249 of the second poppet valve 240, thus preventing high pressure propellant from moving from the second poppet valve 240 to the fourth poppet valve 280.

Also, due to the activation of the solenoid 212, the first poppet housing chamber 236 of the first poppet valve 230 is still fluidly connected to the second spool housing chamber 224 of the first solenoid spool valve 210. However, the second spool housing chamber 224 is also fluidly connected to the vent outlet 203, which provides vent air to the second spool housing chamber 224 of the first solenoid spool valve 210. The vent air is at a lower pressure than the high pressure propellant from the high pressure inlet 201.

The second spool housing chamber 224 is also fluidly connected to the first poppet housing chamber 236 of the first poppet valve 230 and the vent air is provided to the first poppet housing chamber 236. The vent air in the first poppet housing chamber 236 is at a lower pressure than the high pressure propellant in the second poppet housing chamber 234. The force on the poppet 238 from the vent air in the first poppet housing chamber 236 and the biasing mechanism 237 is less than the force on the poppet 238 from the high pressure propellant in the second poppet housing chamber 234, which moves the poppet 238 away from the outlet 239 of the first poppet valve 230 and allows high pressure propellant to move from the first poppet valve 230 to the third poppet valve 270. The outlet 239 of the first poppet valve 230 fluidly connects the second poppet housing chamber 234 of the first poppet valve 230 to the second poppet housing chamber 274 of the third poppet valve 270.

The first poppet housing chamber 276 of the third poppet valve 270 is fluidly connected to the fourth spool housing chamber 268 of the second solenoid spool valve 250. The fourth spool housing chamber 268 is fluidly connected to the vent outlet 204, which provides vent air to the third spool housing chamber 226 of the second solenoid spool valve 250. The vent air is at a lower pressure than the high pressure propellant from the high pressure inlet 201. Since the fourth spool housing chamber 268 is also fluidly connected to the first poppet housing chamber 276 of the third poppet valve 270, the vent air is provided to the first poppet housing chamber 276. The vent air in the first poppet housing chamber 276 is at a lower pressure than the high pressure propellant in the second poppet housing chamber 274. The force on the poppet 278 from the vent air in the first poppet housing chamber 276 and the biasing mechanism 277 is less than the force on the poppet 278 from the high pressure propellant in the second poppet housing chamber 274, which moves the poppet 278 away from the outlet 279 of the third poppet valve 270 and allows high pressure propellant to move from the third poppet valve 270 to the impulse turbine 292. The outlet 279 of the third poppet valve 270 fluidly connects the second poppet housing chamber 274 of the third poppet valve 270 to the impulse turbine 292.

Advantageously, as illustrated by FIG. 2B, high pressure propellant from the high pressure inlet 201 may reach the impulse turbine 292 if the solenoid 212 of the first solenoid spool valve 210 is activated and the solenoid 252 of the second solenoid spool valve 250 is deactivated.

Referring now to FIG. 2C, a solenoid activation scenario of the vehicle power generation system 200 is illustrated when the solenoid 212 of the first solenoid spool valve 210 is deactivated and the solenoid 252 of the second solenoid spool valve 250 is activated. In the solenoid activation scenario illustrated in FIG. 2C, the high pressure inlet 201 is fluidly connected to the second poppet housing chamber 234 of the first poppet valve 230. The high pressure inlet 201 provides high pressure propellant to the second poppet housing chamber 234 of the first poppet valve 230. The second poppet housing chamber 234 of the first poppet valve 230 is fluidly connected to the second poppet housing chamber 244 of the second poppet valve 240 and the high pressure propellant is provided to the second poppet housing chamber 244 of the second poppet valve 240 from the second poppet housing chamber 234. The second poppet housing chamber 244 of the second poppet valve 240 is fluidly connected to the second spool housing chamber 224 of the first solenoid spool valve 210 and the high pressure propellant is provided to the second spool housing chamber 224 of the first solenoid spool valve 210 from the second poppet housing chamber 244. The first spool housing chamber 222 of the first solenoid spool valve 210 is fluidly connected to a vent outlet 203, which provides vent air to the first spool housing chamber 222 of the first solenoid spool valve 210. The vent air is at a lower pressure than the high pressure propellant from the high pressure inlet 201.

The second spool housing chamber 224 of the first solenoid spool valve 210 is also fluidly connected to the first poppet housing chamber 236 of the first poppet valve 230 and the high pressure propellant is provided to the first poppet housing chamber 236 of the first poppet valve 230 from second spool housing chamber 224. The high pressure propellant in the first poppet housing chamber 236 of the first poppet valve 230 balances the forces reacted on the poppet 238 by the high pressure propellant in the second poppet housing chamber 234 of the first poppet valve 230 and allows the biasing mechanism 237 to force the poppet 238 to seal the outlet 239 of the first poppet valve 230, thus preventing high pressure propellant from moving from the first poppet valve 230 to the third poppet valve 270.

Additionally, the third spool housing chamber 226 is fluidly connected to a vent outlet 202. The vent outlet 202 is a source of vent air that is at a pressure lower than the high pressure propellant provided by the high pressure inlet 201. The vent outlet 202 is fluidly connected to the third spool housing chamber 226 and provides vent air to the third spool housing chamber 226. The third spool housing chamber 226 is also fluidly connected to the first poppet housing chamber 246 of the second poppet valve 240 and the vent air is provided to the first poppet housing chamber 246. The vent air in the first poppet housing chamber 246 is at a lower pressure than the high pressure propellant in the second poppet housing chamber 244 of the second poppet valve 240. The force on the poppet 248 from the vent air in the first poppet housing chamber 246 and the biasing mechanism 247 is less than the force on the poppet 248 from the high pressure propellant in the second poppet housing chamber 244, which moves the poppet 248 away from the outlet 249 of the second poppet valve 240 and allows high pressure propellant to move from the second poppet valve 240 to the fourth poppet valve 280. The outlet 249 of the second poppet valve 240 fluidly connects the second poppet housing chamber 244 of the second poppet valve 240 to the second poppet housing chamber 284 of the fourth poppet valve 280.

The outlet 249 of the second poppet valve 240 provides high pressure propellant the second poppet housing chamber 284 of the fourth poppet valve 280. Due to the activation of the solenoid 252, the second poppet housing chamber 284 is no longer fluidly connected to the second spool housing chamber 264 of the second solenoid spool valve 250. Rather the second poppet housing chamber 284 is fluidly connected to the third spool housing chamber 266 and high pressure propellant is provided to the third spool housing chamber 266 from the second poppet housing 284 of the fourth poppet 280.

Also, due to the activation of the solenoid 252, the first poppet housing chamber 286 of the fourth poppet valve 280 is still fluidly connected to the second spool housing chamber 264 of the second solenoid spool valve 250. However, the second spool housing chamber 264 is also fluidly connected to the vent outlet 205, which provides vent air to the second spool housing chamber 264 of the second solenoid spool valve 250. The vent air is at a lower pressure than the high pressure propellant from the high pressure inlet 201.

The second spool housing chamber 264 is also fluidly connected to the first poppet housing chamber 286 of the fourth poppet valve 280 and the vent air is provided to the first poppet housing chamber 286. The vent air in the first poppet housing chamber 286 is at a lower pressure than the high pressure propellant in the second poppet housing chamber 284. The force on the poppet 288 from the vent air in the first poppet housing chamber 286 and the biasing mechanism 287 is less than the force on the poppet 288 from the high pressure propellant in the second poppet housing chamber 284, which moves the poppet 288 away from the outlet 289 of the fourth poppet valve 280 and allows high pressure propellant to move from the fourth poppet valve 280 to the impulse turbine 292. The outlet 289 of the fourth poppet valve 280 fluidly connects the second poppet housing chamber 284 of the fourth poppet valve 280 to the impulse turbine 292.

Advantageously, as illustrated by FIG. 2C, high pressure propellant from the high pressure inlet 201 may reach the impulse turbine 292 if the solenoid 212 of the first solenoid spool valve 210 is deactivated and the solenoid 252 of the second solenoid spool valve 250 is activated.

Referring now to FIG. 2D, a solenoid activation scenario of the vehicle power generation system 200 is illustrated when the solenoid 212 of the first solenoid spool valve 210 is activated and the solenoid 252 of the second solenoid spool valve 250 is activated. In the solenoid activation scenario illustrated in FIG. 2D, the high pressure inlet 201 is fluidly connected to the second poppet housing chamber 234 of the first poppet valve 230. The high pressure inlet 201 provides high pressure propellant to the second poppet housing chamber 234 of the first poppet valve 230. The second poppet housing chamber 234 of the first poppet valve 230 is fluidly connected to the second poppet housing chamber 244 of the second poppet valve 240 and the high pressure propellant is provided to the second poppet housing chamber 244 of the second poppet valve 240 from the second poppet housing chamber 234.

Due to the activation of the solenoid 212, the second poppet housing chamber 244 is no longer fluidly connected to the second spool housing chamber 224 of the first solenoid spool valve 210. Rather the second poppet housing chamber 244 is fluidly connected to the third spool housing chamber 226 and high pressure propellant is provided to the third spool housing chamber 226 from the second poppet housing 244 of the second poppet valve 240. The third spool housing chamber 226 of the first solenoid spool valve 210 is also fluidly connected to the first poppet housing chamber 246 of the second poppet valve 240 and the high pressure propellant is provided to the first poppet housing chamber 246 of the second poppet valve 240 from the third spool housing chamber 226. The high pressure propellant in the first poppet housing chamber 246 of the second poppet valve 240 balances the forces reacted on the poppet 248 by the high pressure propellant in the second poppet housing chamber 244 of the second poppet valve 240 and allows the biasing mechanism 247 to force the poppet 248 to seal the outlet 249 of the second poppet valve 240, thus preventing high pressure propellant from moving from the second poppet valve 240 to the fourth poppet valve 280.

Also, due to the activation of the solenoid 212, the first poppet housing chamber 236 of the first poppet valve 230 is still fluidly connected to the second spool housing chamber 224 of the first solenoid spool valve 210. However, the second spool housing chamber 224 is also fluidly connected to the vent outlet 203, which provides vent air to the second spool housing chamber 224 of the first solenoid spool valve 210. The vent air is at a lower pressure than the high pressure propellant from the high pressure inlet 201.

The second spool housing chamber 224 is also fluidly connected to the first poppet housing chamber 236 of the first poppet valve 230 and the vent air is provided to the first poppet housing chamber 236. The vent air in the first poppet housing chamber 236 is at a lower pressure than the high pressure propellant in the second poppet housing chamber 234. The force on the poppet 238 from the vent air in the first poppet housing chamber 236 and the biasing mechanism 237 is less than the force on the poppet 238 from the high pressure propellant in the second poppet housing chamber 234, which moves the poppet 238 away from the outlet 239 of the first poppet valve 230 and allows high pressure propellant to move from the first poppet valve 230 to the third poppet valve 270. The outlet 239 of the first poppet valve 230 fluidly connects the second poppet housing chamber 234 of the first poppet valve 230 to the second poppet housing chamber 274 of the third poppet valve 270.

Due to the activation of the solenoid 252, the second poppet housing chamber 274 is no longer fluidly connected to the third spool housing chamber 266 of the second solenoid spool valve 250. Rather the second poppet housing chamber 274 is fluidly connected to the fourth spool housing chamber 268 and high pressure propellant is provided to the fourth spool housing chamber 268 from the second poppet housing 274 of the third poppet valve 270. The fourth spool housing chamber 268 of the second solenoid spool valve 250 is also fluidly connected to the first poppet housing chamber 276 of the third poppet valve 270 and the high pressure propellant is provided to the first poppet housing chamber 276 of the third poppet valve 270 from the fourth spool housing chamber 268. The high pressure propellant in the first poppet housing chamber 276 of the third poppet valve 270 balances the forces reacted on the poppet 278 by the high pressure propellant in the second poppet housing chamber 274 of the third poppet valve 270 and allows the biasing mechanism 277 to force the poppet 278 to seal the outlet 279 of the third poppet valve 270, thus preventing high pressure propellant from moving from the third poppet valve 270 to the impulse turbine.

Advantageously, as illustrated by FIG. 2D, high pressure propellant from the high pressure inlet 201 may be prevented from reaching the impulse turbine 292 if the solenoid 212 of the first solenoid spool valve 250 is activated and the solenoid 252 of the second solenoid spool valve 250 is activated.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle power generation system comprising:
   a first solenoid spool valve;
   a second solenoid spool valve;
   a first poppet valve fluidly connected to a high pressure inlet;
   a second poppet valve fluidly connected to the first solenoid spool valve and the first poppet valve;
   a third poppet valve fluidly connected to the second solenoid spool valve, the first poppet valve, and an impulse turbine; and
   a fourth poppet valve fluidly connected to the second solenoid spool valve, the second poppet valve, and the impulse turbine.

2. The vehicle power generation system of claim 1, wherein the first solenoid spool valve further comprises:
a spool housing;
a spool located at least partially within the spool housing, the spool fluidly separating the spool housing into a first spool housing chamber, a second spool housing chamber, a third spool housing chamber, and a fourth spool housing chamber; and
a solenoid operably connected to the spool, the solenoid being configured to translate the spool linearly within the spool housing.

3. The vehicle power generation system of claim 2, wherein the fourth spool housing chamber is located proximate the solenoid and the first spool housing chamber is located opposite the fourth spool housing chamber, wherein the second spool housing chamber and the third spool housing chamber are linearly interposed between the first spool housing chamber and the fourth spool housing chamber, and wherein the second spool housing chamber is linearly interposed between the first spool housing chamber and the third spool housing chamber.

4. The vehicle power generation system of claim 3, further comprising:
a biasing mechanism located within the first spool housing chamber.

5. The vehicle power generation system of claim 1, wherein the second solenoid spool valve further comprises:
a spool housing;
a spool located at least partially within the spool housing, the spool fluidly separating the spool housing into a first spool housing chamber, a second spool housing chamber, a third spool housing chamber, a fourth spool housing chamber, and a fifth spool housing chamber; and
a solenoid operably connected to the spool, the solenoid being configured to translate the spool linearly within the spool housing.

6. The vehicle power generation system of claim 5, wherein the fifth spool housing chamber is located proximate the solenoid and the first spool housing chamber is located opposite the fifth spool housing chamber, wherein the second spool housing chamber, the third spool housing chamber, and fourth spool housing camber are linearly interposed between the first spool housing chamber and the fifth spool housing chamber, wherein the second spool housing chamber is linearly interposed between the first spool housing chamber and the third spool housing chamber, and wherein the third spool housing chamber is linearly interposed between the second spool housing chamber and the fourth spool housing chamber.

7. The vehicle power generation system of claim 6, further comprising:
a biasing mechanism located within the first spool housing chamber.

8. The vehicle power generation system of claim 1, wherein the first poppet valve further comprises:
a poppet housing having an outlet;
a poppet located within the poppet housing, the poppet fluidly separating the poppet housing into a first poppet housing chamber and a second poppet housing chamber; and
a biasing mechanism located in the first poppet housing chamber, the biasing mechanism being configured to applies a linear force on the poppet towards the outlet of the first poppet housing.

9. The vehicle power generation system of claim 2, wherein the first poppet valve further comprises:
a poppet housing having an outlet;
a poppet located within the poppet housing, the poppet fluidly separating the poppet housing into a first poppet housing chamber and a second poppet housing chamber; and
a biasing mechanism located in the first poppet housing chamber, the biasing mechanism applies a linear force on the poppet towards the outlet of the first poppet housing,
wherein the first poppet housing chamber is fluidly connected to the second spool housing chamber of the first solenoid spool valve, and wherein the second poppet housing chamber is fluidly connected to the high pressure inlet.

10. The vehicle power generation system of claim 9, further comprising:
a vent outlet fluidly connected to the first spool housing chamber when the solenoid of the first solenoid spool valve is deactivated and fluidly connected to the second spool housing chamber when the solenoid of the first solenoid spool valve is activated.

11. The vehicle power generation system of claim 9, wherein the second poppet housing chamber is fluidly connected to the third poppet valve.

12. The vehicle power generation system of claim 2, wherein the second poppet valve further comprises:
a poppet housing having an outlet;
a poppet located within the poppet housing, the poppet fluidly separating the poppet housing into a first poppet housing chamber and a second poppet housing chamber; and
a biasing mechanism located in the first poppet housing chamber, the biasing mechanism applies a linear force on the poppet towards the outlet of the first poppet housing,
wherein the first poppet housing chamber is fluidly connected to the third spool housing chamber of the first solenoid spool valve, and wherein the second poppet housing chamber is fluidly connected to the second spool housing chamber of the first solenoid spool valve.

13. The vehicle power generation system of claim 12, further comprising:
a vent outlet fluidly connected to the third spool housing chamber when the solenoid of the first solenoid spool valve is deactivated and fluidly connected to the fourth spool housing chamber when the solenoid of the first solenoid spool valve is activated.

14. The vehicle power generation system of claim 12, wherein the second poppet housing chamber is fluidly connected to the fourth poppet valve.

15. The vehicle power generation system of claim 5, wherein the third poppet valve further comprises:
a poppet housing having an outlet;
a poppet located within the poppet housing, the poppet fluidly separating the poppet housing into a first poppet housing chamber and a second poppet housing chamber; and
a biasing mechanism located in the first poppet housing chamber, the biasing mechanism applies a linear force on the poppet towards the outlet of the first poppet housing,
wherein the first poppet housing chamber is fluidly connected to the fourth spool housing chamber of the second solenoid spool valve, and wherein the second poppet housing chamber is fluidly connected to the third spool housing chamber of the second solenoid spool valve when the solenoid of the second solenoid spool valve is deactivated and fluidly connected to the fourth spool housing chamber of the second solenoid spool valve when the solenoid of the second solenoid spool valve is activated.

16. The vehicle power generation system of claim 15, further comprising:

a vent outlet fluidly connected to the fourth spool housing chamber when the solenoid of the second solenoid spool valve is deactivated and fluidly connected to the fifth spool housing chamber when the solenoid of the first solenoid spool valve is activated.

17. The vehicle power generation system of claim 15, wherein the second poppet housing chamber is fluidly connected to the impulse turbine.

18. The vehicle power generation system of claim 5, wherein the fourth poppet valve further comprises:

a poppet housing having an outlet;

a poppet located within the poppet housing, the poppet fluidly separating the poppet housing into a first poppet housing chamber and a second poppet housing chamber; and a biasing mechanism located in the first poppet housing chamber, the biasing mechanism applies a linear force on the poppet towards the outlet of the first poppet housing, wherein the first poppet housing chamber is fluidly connected to the second spool housing chamber of the second solenoid spool valve, and wherein the second poppet housing chamber is fluidly connected to the second spool housing chamber of the second solenoid spool valve when the solenoid of the second solenoid spool valve is deactivated and fluidly connected to the third spool housing chamber of the second solenoid spool valve when the solenoid of the second solenoid spool valve is activated.

19. The vehicle power generation system of claim 18, further comprising:

a vent outlet fluidly connected to the first spool housing chamber when the solenoid of the second solenoid spool valve is deactivated and fluidly connected to the second spool housing chamber when the solenoid of the first solenoid spool valve is activated.

20. The vehicle power generation system of claim 18, wherein the second poppet housing chamber is fluidly connected to the impulse turbine.

* * * * *